Feb. 27, 1940.　　　　H. A. FLOGAUS　　　　2,191,526

MOTOR VEHICLE

Filed May 9, 1938

INVENTOR.
Howard A. Flogaus
BY
ATTORNEY.

Patented Feb. 27, 1940

2,191,526

UNITED STATES PATENT OFFICE 2,191,526

MOTOR VEHICLE

Howard A. Flogaus, Lansing, Mich., assignor to Reo Motor Car Company, Lansing, Mich., a corporation of Michigan Application May 9, 1938, Serial No. 206,782

7 Claims. (Cl. 237—12.3)

This invention relates generally to motor vehicles and more particularly to heat transfer systems for the passenger compartments of motor coaches or buses.

In motor coaches having the vehicle engine at the rear thereof and a heater at the front thereof connected to the engine water cooling system by supply and return pipes, it has been the practice to extend the pipes along the sides and adjacent the floor of the vehicle body. With this arrangement, the supply and return pipes must necessarily extend upwardly from the floor and over the vehicle wheel-housings which, in many cases, are above the plane of the engine water pump or above the heater or both, which is detrimental to proper circulation of the water. In addition to the supply and return pipes of such arrangements being unduly long resulting in a corresponding high resistance to the flow of water, the high portions of the pipes where they extend over the wheel housings cause air pockets in the pipes which seriously interferes with the water circulation.

Accordingly, it is an object of the present invention to provide a heat exchange system in which the above mentioned objections are obviated.

Further objects of the invention are to provide straight pipes connecting the heat exchanger with the vehicle engine water cooling system and to arrange and support said pipes in a new and improved manner with respect to the vehicle body floor.

Other objects and advantages of the invention will become apparent from a reading of the following description in connection with the accompanying drawing in which.

Figure 1:
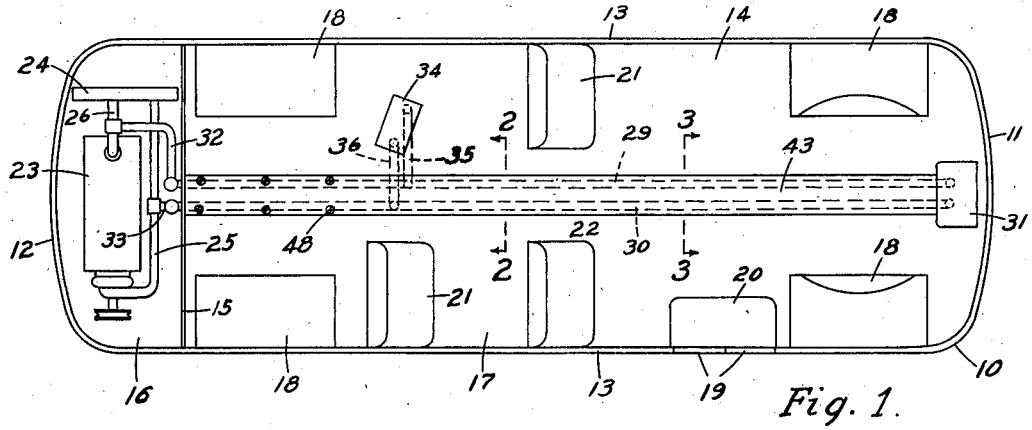
Fig. 1 is a diagrammatical plan view of a motor coach embodying the present invention.

Referring to the drawing by characters of reference, the motor coach includes a rectangular body 10, formed in part by a front wall 11, rear wall 12, side walls 13 and a bottom wall or floor 14. An internal upright partition 15, adjacent the rear end of the body 10, divides the interior thereof into a rear engine compartment 16 and a forward passenger compartment 17. Extending upwardly, above the floor 14 and adjacent the opposite side walls 13 are the usual wheel-housings 18 and in one of the side walls 13 a door opening and doors 19 are provided, the floor 14 having a step well 20 at the door opening. Disposed in the passenger compartment a number of seats 21 are disposed within the passenger compartment 17 and arranged along opposite sides of the body to provide a center aisle 22 therebetween longitudinally of the body. In the engine compartment 16, the vehicle engine 23 is provided with a water cooling system including a radiator 24 connected to the water jackets (not shown) of the engine 23 by a cold water supply pipe 25 and a hot water return pipe 26.

The floor 14, which for the most part may be constructed of wood, is provided with an elongated opening 27 therethrough which extends from front to rear of the passenger compartment along the center aisle between the opposite wheel-housings 18 and is closed by a metallic conduit or duct 28 which forms a part of the floor and within which the hot water supply pipe 29 and a cold water return pipe 30 extend longitudinally and in a straight line to connect the engine water cooling system to a heat exchanger 31 positioned in the passenger compartment 17 adjacent the front body wall 11. Within the engine compartment 16, a branch pipe 32 and suitable pipe fittings may be provided to connect the heat exchanger supply pipe 29 to the hot water supply pipe 26 leading to the radiator 24, and similarly the cold water return pipe 30 leading from the heat exchanger 31 may be connected to the cold water return pipe 25 of the engine cooling system by a branch pipe 33. In the passenger compartment 17 a second or auxiliary heat exchanger 34 of any suitable type may be provided if desired and may be connected to the supply pipe 29 by a branch pipe 35 and to the return pipe 30 by a branch pipe 36.

Figures 2, 3:
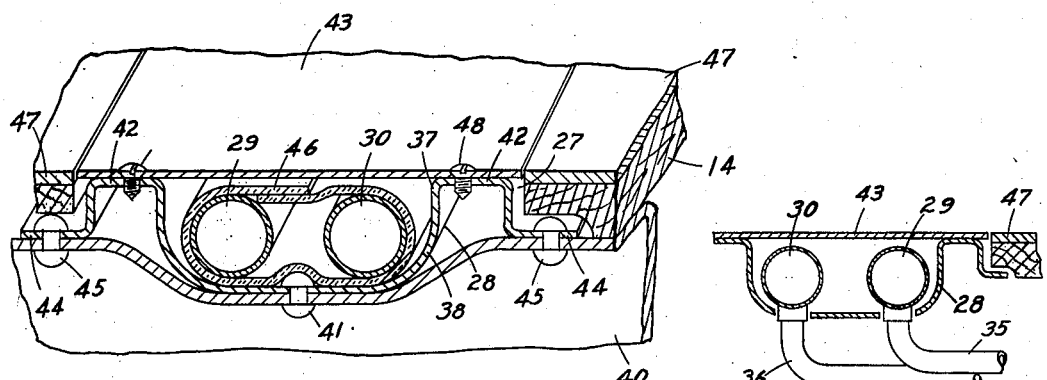
Fig. 2 is an enlarged view shown in cross section of the vehicle floor taken along the line and in the direction of the arrows 2—2 of Fig. 1.
Fig. 3 is an enlarged view shown in cross section of the vehicle floor, taken along the line and in the direction of the arrows 3—3 of Fig. 1.

Referring now more particularly to Fig. 3, the duct 28 includes a channel-shaped member 37 which is positioned in and closes the floor opening 27 and is provided with a depressed portion 38 extending longitudinally thereof in which are positioned the supply and return pipes 29 and 30 respectively. The body 10 may be provided with a number of transverse frame members 40 upon which the floor 14 may rest and are each provided in the present instance with an upwardly facing recess in which the depressed portion 38 of the ducts 28 may seat and may be rigidly secured thereto by rivets 41 or by other suitable means. The spaced channel-shaped portions of the duct 28 include outturned horizontal flanges 42 adjacent the top of the floor to form supports for a removable closure member 43 overlying the pipes 29 and 30 in the plane of the vehicle floor. The flanges 42 are offset downwardly adjacent the sides of the opening 27 and provided with outturned flanges 44 which seat on the supporting members 40 and which may be rigidly secured thereto by rivets 45 or by other suitable means. Suitable heat insulating material 46, wrapped around the pipes 29 and 30 is provided to decrease heat conduction between the pipes and the adjacent metal parts of the duct 28 and is held under compression by the cover 43 to prevent rattling of the pipes.

Figure 4:
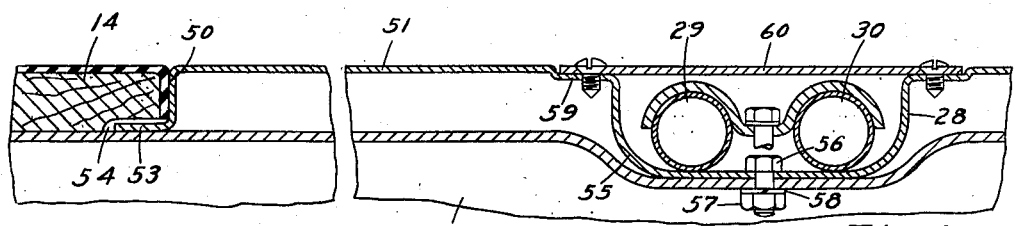
Fig. 4 is a view in cross section and perspective of a modification of the invention.

In the modification of Fig. 4, the floor 14 of the vehicle body is provided with an elongated opening 50 extending from front to rear of the passenger compartment and in width between opposite seats, being substantially the same width as the center aisle, and a cast, metallic closure member 51 is positioned in the opening substantially flush with the wood floor 14. Along its side edges, longitudinally thereof, the closure member 51 is provided with downwardly offset outturned flanges 53 to seat upon the upper surface of the transverse body supporting member 40, the wood flooring 14 being recessed, as at 54, to receive the flanges 53. Substantially midway between its longitudinal edges, the closure member 51 is formed with a depressed portion 55, extending longitudinally thereof, to receive the pipes 29 and 30, and the lower wall thereof rests within the recesses of the supporting members 40 to be secured thereto by bolts 56 on which nuts 57 may be tightened down against lock washers 58. At the depressed portions 55 along the opposite side walls thereof, the casting 51 is provided with slight and downwardly offset portions 59 providing upwardly facing seating surfaces for a removable closure member 60 which may be secured thereto by screws or by other suitable means and cooperates with the depressed portion 55 of the casting to provide a closed duct.

Figure 5:
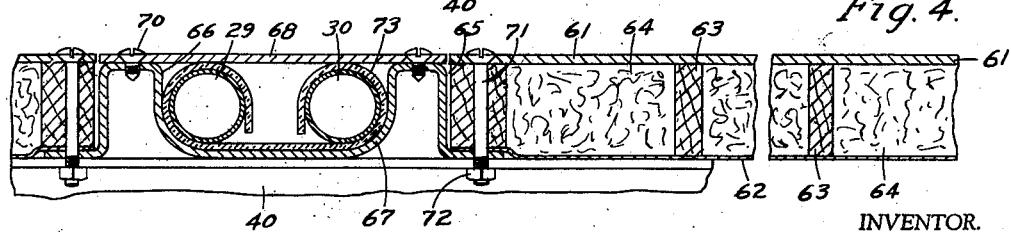
Fig. 5 is an enlarged view in section showing a further modification.

Referring now to Fig. 5, in this modification, the floor of the vehicle body is provided with an upper horizontal floor section 61 and a similar lower section 62 spaced by a plurality of vertical struts 63, the spaces between the upper and lower floor sections being filled with suitable heat insulating material 64 such as asbestos. Like the previously described constructions, the floor in Fig. 3 is provided with an elongated opening 65 extending therethrough down the center of the vehicle and is closed by a metallic member 66 having a depressed portion 67 in which the pipes 29 and 30 position below the floor line and covered by a plate 68 which may be secured in place by screws 70. The closure member 66 is similar to the closure member 37 of Fig. 3 but differs therefrom in that its depressed portion 67 does not extend down to the point where clearance depressions are necessary in the transverse supporting members 40, the pipes being disposed between the upper and lower floor sections 61 and 62 respectively. Also, in this construction bolts 71 and nuts 72 therefor may be provided to secure the wood floor and the metallic closure member 66 rigidly together and to the flanges of the transverse floor supporting members 40. In the duct 28, between the pipes 29 and 30 and the wall of the depressed duct portion 67, suitable heat insulating material 73 may be provided to decrease the conduction of heat between these parts.

It will be seen that by providing means whereby the supply and return pipes connecting the engine cooling system to the passenger compartment heater may be positioned between the vehicle wheel-housings and below the vehicle floor, these pipes may run in a straight line providing minimum resistance to circulation of water therethrough. It will further be seen that the several novel duct structures for floors of vehicle bodies are not only suitable to receive supply and return pipes for hot water heaters but among other things may be employed for cooling system pipes, electric cables or for the air lines of compressed air brakes.

What is claimed and desired to be secured by Letters Patent is:

1. In a motor vehicle comprising a frame having a plurality of cross members, a hollow body having wheel housings extending upwardly thereinto adjacent the opposite sides thereof, and a floor supported on said cross members, said floor including an upwardly opening channel located between said wheel housings and extending longitudinally of said body, fluid heating means at one end of said body, a heat exchanger at the other end of said body, ducts connecting said fluid heating means and said heat exchanger for conveying fluid between them, said ducts being located in said channel, and a cover for concealing said ducts, said cover overlying said channel and being secured to said floor.

2. In a motor vehicle comprising a frame having a plurality of cross members, a hollow body having wheel housings extending upwardly thereinto adjacent the opposite sides thereof, and a floor supported on said cross members, said floor including an upwardly opening channel supported on said cross members and located between said wheel housings, said channel extending longitudinally of said body, fluid heating means at one end of said body, a heat exchanger at the other end of said body, ducts located in the channel and connecting said fluid heating means and said heat exchanger for conveying fluid between them, and an imperforate cover for concealing said ducts, said cover overlying the said channel and being secured to said floor flush with the upper surface thereof.

3. In a motor vehicle comprising a frame having a plurality of cross members, a hollow body having wheel housings extending upwardly thereinto adjacent the opposite sides thereof, and a floor supported on said cross members, said floor including an upwardly opening channel located between said wheel housings and extending longitudinally of said body, fluid heating means at one end of said body, a heat exchanger at the other end of said body, ducts connecting said fluid heating means and said heat exchanger for conveying fluid between them, said ducts being located in said channel, a cover for concealing said ducts, said cover overlying said channel and being secured to the floor, and means for clamping said ducts to said channel and said channel to said cross members.

4. In a motor vehicle comprising a frame having a plurality of cross members, the upper walls of said cross members having upwardly facing recesses therein, a floor supported on said cross members, said floor including an upwardly opening channel located in said recesses and extending longitudinally of said body, fluid heating means at one end of said body, ducts connecting said fluid heating means and said heat exchanger for conveying fluid between them, said ducts being located in said channel, and a cover for concealing said ducts, said cover overlying said channel and being secured to said floor.

5. A motor vehicle comprising a frame having a plurality of cross members, a hollow body having a floor, said floor including laterally spaced longitudinally extending sections supported on said cross members, an upwardly opening channel resting on said cross members between the laterally spaced sections of said floor and extending longitudinally of said body, fluid heating means at one end of said body, a heat exchanger adjacent the other end of said body, ducts connecting said fluid heating means and said heat exchanger for conveying fluid between them, said ducts being located in said channel, and an imperforate cover for concealing said ducts, said cover being secured to and overlying said channel and located substantially flush with the upper surfaces of the laterally spaced sections of said floor.

6. In a motor vehicle comprising a frame having a plurality of cross members, a hollow body having a floor supported on said cross members, said floor including an upwardly opening channel extending longitudinally of said body, the side walls of said channel having flanges adjacent the upper edges thereof, said flanges extending laterally outwardly and downwardly and being secured to said cross members, fluid heating means at one end of said body, a heat exchanger at the other end of said body, ducts connecting said fluid heating means and said heat exchanger for conveying fluid between them, said ducts being located in said channel, and a cover for concealing said ducts, said cover overlying said channel and being secured to said floor.

7. In a motor vehicle comprising a frame having a plurality of cross members, a hollow body having a floor supported on said cross members, said floor including laterally spaced longitudinally extending sections supported on said cross members, an upwardly opening channel supported on said cross members between said laterally spaced sections and extending longitudinally of said body, the side walls of said channel having flanges adjacent the upper edges thereof, said flanges extending laterally outwardly and downwardly into contact with said cross members, the free edges of said flanges overlapping the adjacent edges of said laterally spaced sections and being secured thereto, fluid heating means at one end of said body, a heat exchanger at the other end of said body, ducts connecting said fluid heating means and said heat exchanger for conveying fluid between them, said ducts being located in said channel, and a cover for concealing said ducts, said cover overlying said channel and being secured to said floor.

HOWARD A. FLOGAUS.